United States Patent
Zhang et al.

(10) Patent No.: US 11,544,830 B2
(45) Date of Patent: Jan. 3, 2023

(54) ENHANCING IMAGE DATA WITH APPEARANCE CONTROLS

(71) Applicant: IMAX Corporation, Mississauga (CA)

(72) Inventors: Ning Zhang, Oakville (CA); Samuel Ziheng Zhou, Mississauga (CA); Paul Judkins, Toronto (CA)

(73) Assignee: IMAX Corporation, Mississauga (CA)

( * ) Notice: Subject to any disclaimer, the term of this patent is extended or adjusted under 35 U.S.C. 154(b) by 0 days.

(21) Appl. No.: 16/962,379

(22) PCT Filed: Jan. 18, 2019

(86) PCT No.: PCT/IB2019/050440
§ 371 (c)(1),
(2) Date: Jul. 15, 2020

(87) PCT Pub. No.: WO2019/145835
PCT Pub. Date: Aug. 1, 2019

(65) Prior Publication Data
US 2021/0065341 A1   Mar. 4, 2021

Related U.S. Application Data

(60) Provisional application No. 62/620,711, filed on Jan. 23, 2018.

(51) Int. Cl.
*G06K 9/00* (2022.01)
*G06T 5/50* (2006.01)
*G06T 7/70* (2017.01)

(52) U.S. Cl.
CPC .............. *G06T 5/50* (2013.01); *G06T 7/70* (2017.01); *G06T 2207/10016* (2013.01); *G06T 2207/20072* (2013.01); *G06T 2207/20221* (2013.01)

(58) Field of Classification Search
CPC ... G06T 5/50; G06T 7/70; G06T 2207/10016; G06T 2207/20072; G06T 2207/20221;
(Continued)

(56) References Cited

U.S. PATENT DOCUMENTS

| 9,223,551 | B1* | 12/2015 | Heirich | G06F 8/433 |
| 2020/0342570 | A1* | 10/2020 | Yuan | G06T 7/593 |
| 2020/0364838 | A1* | 11/2020 | Liu | G06T 11/001 |

FOREIGN PATENT DOCUMENTS

| CA | 2901924 A1 | 10/2014 |
| WO | 2014165721 A1 | 10/2014 |

OTHER PUBLICATIONS

Tang, Ying, et al. "Multi-style video stylization based on texture advection." Science China Information Sciences 58.11 (2015): 1-13. (Year: 2015).*

(Continued)

*Primary Examiner* — Andrew M Moyer
(74) *Attorney, Agent, or Firm* — Kilpatrick Townsend and Stockton LLP

(57) ABSTRACT

A digital image sequence with multiple image frames can be enhanced. An appearance graph can be determined from the digital image sequence. The appearance graph includes prime layer nodes. Each prime layer node can represent a distinctive visual style. A prime layer image sequence can be computed for each prime layer node that matches the visual style represented by the prime layer node. An enhanced image sequence can be generated by blending at least two prime layer image sequences as defined by the appearance graph.

20 Claims, 6 Drawing Sheets

(58) Field of Classification Search
CPC . G06T 2207/20076; G06T 2207/20208; G06T 2207/30201; G06T 5/003; G06T 5/007; G06T 5/002
See application file for complete search history.

(56) References Cited

OTHER PUBLICATIONS

Chen, Dongdong, et al. "StyleBank: An Explicit Representation for Neural Image Style Transfer." 2017 IEEE Conference on Computer Vision and Pattern Recognition (CVPR). IEEE, 2017. (Year: 2017).*
International Patent Application No. PCT/IB2019/050440, International Search Report and Written Opinion, May 9, 2019, 9 pages.
EP/ Application No. EP19743260.2 , Extended European Search Report, dated Oct. 12, 2021, 7 pages.
Application No. IN202037035439, "First Examination Report", dated Apr. 13, 2022, 8 pages.

* cited by examiner

ENHANCING IMAGE DATA WITH APPEARANCE CONTROLS

CROSS-REFERENCE TO RELATED APPLICATIONS

This disclosure claims priority to U.S. Provisional Application Ser. No. 62/620,711, titled "Enhancing Image Data with Appearance Controls" and filed Jan. 23, 2018.

FIELD OF THE DISCLOSURE

This disclosure relates generally to the field of digitally enhancing the visual quality of image content and, more particularly, to the ability to control the visual appearance of the image content specially tailored for various types of media platforms.

BACKGROUND

The visual quality of a motion picture or video content can be improved by digitally processing image data in the temporal domain using sophisticated motion estimation or optical flow methods. In those methods, the movement of each pixel is tracked over numerous image frames, and pixels are enhanced for better quality attributes including noise reduction, deblurring, artifact removal, and detail enhancement. But, the computing process of temporal processing technology is very time consuming due to high computational complexities, and the computing time may exponentially increase as image resolution gets higher and as the motion tracking algorithms become more sophisticated. The process may take hours or days before any results are available from a computing job. If the resulting visual quality is not satisfactory, the user makes adjustments to certain render parameters and starts the tedious computation job over. As a result, it becomes very difficult for a typical post-production facility, which can be under a very tight time schedule and a very limited production budget, to fine tune the image quality to the satisfaction of a client.

And image content is often released across multiple types of displays, such as cinema, packaged media, cable television, or streaming to tablets and mobile devices. There can be vast differences with different types of display platforms, in terms of brightness, resolution, sharpness, color, contrast, bit rates, etc., or whether the display is direct view display or having an image that is being projected onto display, and image data is processed with consideration of those differences to maintain a consistent artistic style or visual appearance over multiple platforms. For example, a motion picture may be timed for a 30-foot wide matte cinema screen with an organic "film look." When the film is up converted for a large-format theater release, such as a 60-foot wide silver screen by IMAX®, the film grain preserved in the image data is further suppressed so that it does not get overly magnified. When the film is to be released through a streaming service, such as Netflix®, Amazon®, or Hulu®, for television viewing, the image data is often re-mastered for a much higher brightness level, for Rec. 709 color space instead of P3, and with a much higher level of data compression. Furthermore, the same film from the same streaming service provider may also look vastly different, partially due to the adaptive streaming protocol used to adjust the quality of a video stream according to available network bandwidth, and partially due to different display quality with user's devices. The recent rapid market adoption of latest UHD, HDR, WCG and HFR display technologies can further impact the quality gaps among different display platforms to whom the same content is to be released.

DETAILED DESCRIPTION

Figure 1:
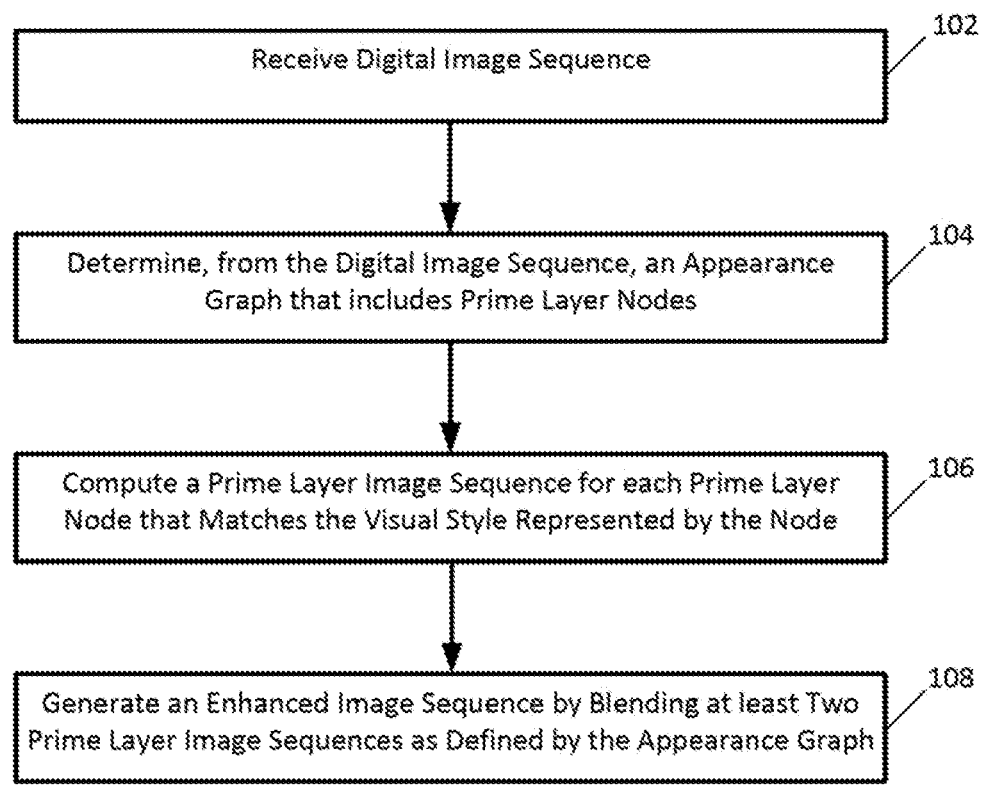
FIG. 1 is a flowchart of a process for enhancing a digital image sequence according to some aspects of the present disclosure.

Certain aspects and features relate to enhancing one or more characteristics of an image sequence by computing a number of prime layer image sequences with distinctive characteristics. The distinctive characteristics can be specific visual features related to a style of image. A combination of prime layer image sequences can be blended to generate a specific visual appearance. A prime layer of an image sequence can be a digital representation of a majority of content in the image sequence. An image sequence includes multiple image frames. Each image frame includes multiple image pixels. A typical image pixel can define an image-content element at a space-time location that is related to neighboring image pixels in the same image frame, and may be related to corresponding pixels across many image frames.

To achieve a high performance, image enhancement algorithms may operate in the temporal domain by exploring pixel relations across multiple image frames. Due to the time-varying nature of image sequences, such algorithms may include estimating pixel motion and tracking pixel movement over multiple image frames. Examples of the methods of motion estimation and tracking may include optical flow based methods and more sophisticated trajectory based methods. With motion estimation and tracking, however, the resulting algorithm may become very complex and time-consuming in computation. Moreover, the performance of such an algorithm may be difficult to control, and a trial and error method may be applied to attain intended results: if the result from one computation pass is not satisfactory, certain render parameters may be adjusted and another computation pass is executed. Such a process can be costly and time consuming.

Image quality and appearance specifications can be achieved according to some examples. An image sequence can be processed using a variant of methods to produce a number of renditions of image sequences with distinctive looks or artistic styles. At least a subset of those renditions can be blended (e.g., by mixing) together to produce a new image sequence with a new visual appearance. The resulting image sequence can attain a new visual appearance resulting from a mixture of different artistic styles. If the new visual appearance is still not satisfactory, it can be fine-tuned by carefully adjusting the contribution from each artistic style until a desirable visual appearance is reached. The renditions of the image sequence may be computed ahead of time so that they become available as the bases for subsequent combining and fine tuning operations that use much simpler and faster processing methods.

In one example, a number of prime layer image sequences are computed from an image sequence. Each prime layer image sequence can represent a distinctive artistic style. Certain prime layer image sequences may be blended together to produce a new visual appearance. The blending processing may include a blending function, and the contribution of individual prime layer image sequences towards the new visual appearance can be quantitatively described by appropriate weights used in the blending function. The visual appearance may be fine-tuned to produce a desirable visual appearance by adjusting the weights of individual prime layer image sequences.

These illustrative examples are given to introduce the reader to the general subject matter discussed here and are not intended to limit the scope of the disclosed concepts. The following sections describe various additional features and examples with reference to the drawings.

FIG. 1 is a flowchart of a process for enhancing a digital image sequence according to one example of the present disclosure. In block 102, the digital image sequence is received, such as by being received by a computing device. The digital image sequence can have multiple image frames that together form a visual media presentation, such as a movie. In some examples, the digital image sequence can include or represent digital data. The digital data can be data that is intended to be used as streamed data or as data that is downloaded and stored from a remote source.

In block 104, an appearance graph is determined from the digital image sequence. The appearance graph can include prime layer nodes that define each of the prime layer image sequences. Each prime layer node can represent a distinctive visual style. The appearance graph can be determined from the digital image sequence by separately processing the digital image sequence. Processing the digital image sequence can include implementing image data analysis and feedback from a film director to determine primary layer nodes that reflect visual features or styles that can appeal to the film director.

In block 106, a prime layer image sequence is computed for each prime layer node that matches the visual style represented by the node.

In block 108, an enhanced image sequence is generated by blending at least two prime layer image sequences as defined by the appearance graph. The prime layer image sequences may be separately weighted prior to blending the image sequences together. In some examples, the enhanced image sequence can be refined to achieve a specific visual appearance by adjusting the weights used in blending the prime layer image sequences.

Figure 2:
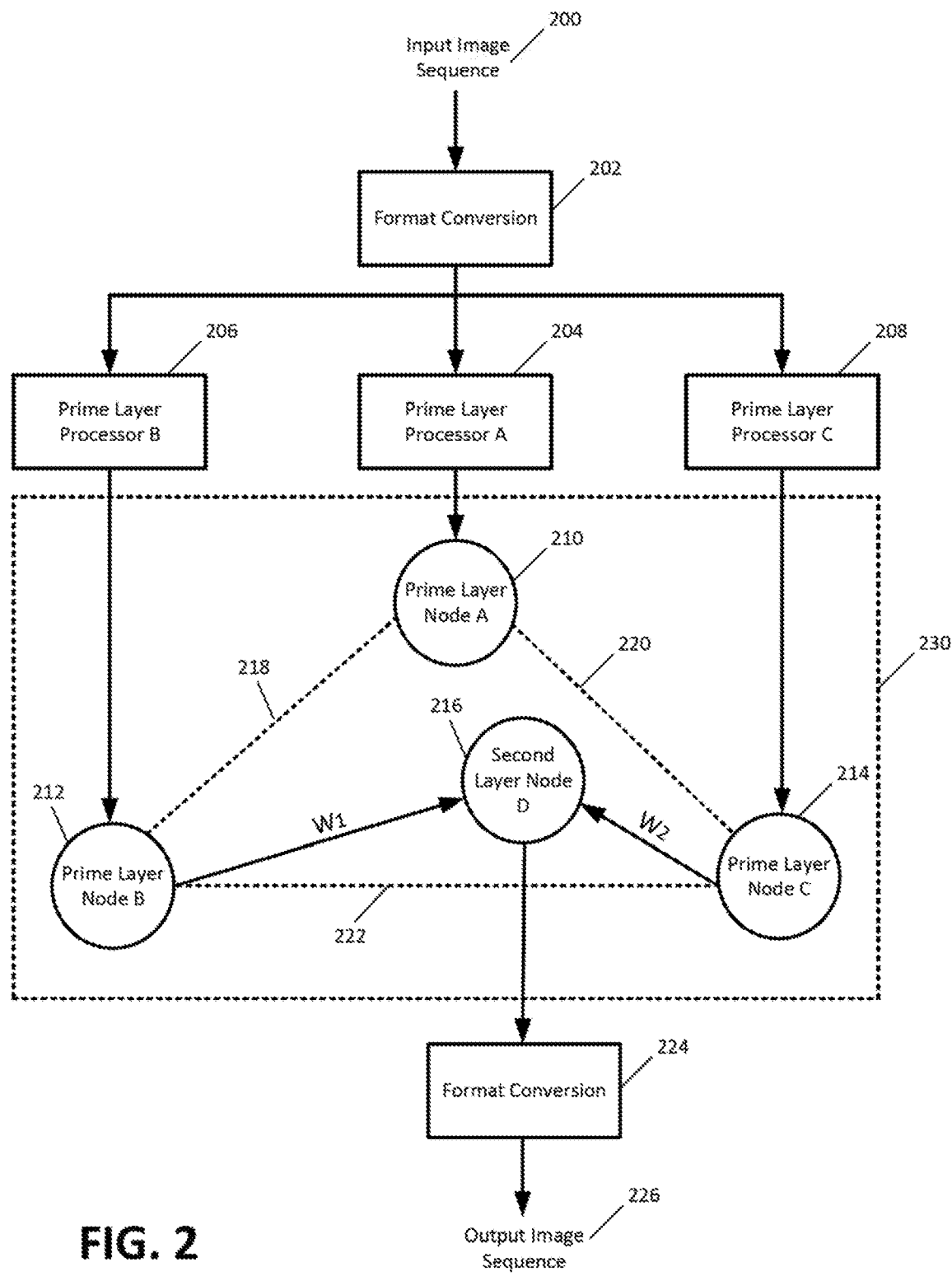
FIG. 2 is a diagram of a system for enhancing an image sequence using a blending process according to some aspects of the present disclosure.
Figure 6:
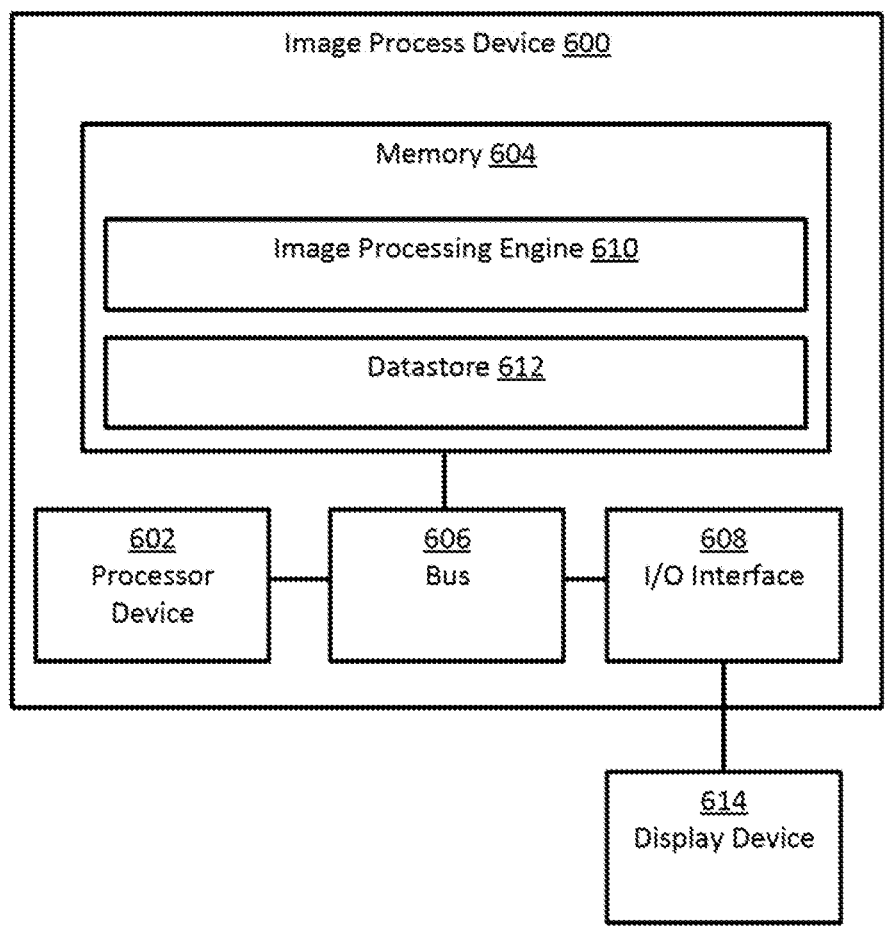
FIG. 6 is a block diagram of an image processing device for enhancing an image sequence according to some aspects of the present disclosure.

FIG. 2 is a schematic block diagram of a system for enhancing an image sequence according to some aspects of the present disclosure. An image processing device can be used to perform the image processing operations according to various examples. An example of the image processing device is depicted in FIG. 6, which may support a limited set of file formats for both input and output image sequences. In FIG. 2, the image processing device receives an input image sequence 200 that may be a motion picture or digital video content. The image sequence 200 can include multiple image frames. A format conversion process 202 is applied to the input image sequence 200 to convert its file format into one of the digital formats that is supported by the image processing device. Examples of the digital formats that are supported may include common uncompressed raster formats such as TIFF, OpenEXR, DPX, PNG, and ACES. The file conversion process 202 may also perform video decoding if the input image sequence 200 is encoded by a video compression method such as MPEG, JPEG, H.264, AVC or ProRes. The file format conversion process 202 may also perform decryption if the input image sequence 200 is encrypted. If the input image sequence 200 is already packaged in a format that is supported by the image processing device, the file conversion process 202 can be skipped and the input image sequence 200 can be provided for further processing.

The image sequence can be further digitally processed into a number of prime layer sequences. In the example as shown in FIG. 2, the image sequence is rendered into three different versions by three individual prime layer processors 204, 206, 208. A prime layer sequence is rendered out from the input image sequence by prime layer processor A 204, and it is represented by prime layer node A 210. A second prime layer sequence is produced by prime layer processor B 206, and it is represented by prime layer node B 212. A third prime layer sequence is generated by prime layer processor C 208, and it is represented by prime layer node C 214. Each prime layer image sequence can represent a distinctive artistic style so that it becomes possible to produce an intended visual appearance by a combination of some or all of the prime layer image sequences. Any number of prime layer nodes can be used.

Each of the prime layer processors 204, 206, 208 in FIG. 2 can include a set of image processing methods and algorithms, designed to generate a prime layer image sequence with a particular artistic style. In one example, one or more of the prime layer processors 204, 206, 208 may enhance image details, such as motion features, by computing accurate pixel motion trajectories across multiple image frames. Images can be first decomposed into layers, and features of the image content can be determined for each layer. A trajectory can represent space-time locations of selected image content elements over a length of the image sequence. Anchor trajectories can be computed in each layer based on feature connections. The feature connections can include links that connect image pixels in the layers among space-time locations. The anchor trajectory can be based on at least one selected feature connection among the feature connections. The relationship of each pixel with the anchor trajectories can be analyzed, and new trajectories can be created for each pixel based on the resulting relationships with anchor trajectories. The resulting trajectories can be further optimized through an iterative refining process. With highly accurate trajectories established for each pixel of an image sequence, it can be possible to produce a prime layer sequence with an artistic style of super resolution, where fine image details are enhanced and certain missing image details are recovered.

In addition or alternatively, one or more of the prime layer processors 204, 206, 208 may include a method of noise reduction that preserves image edges. Spatial and temporal computing processes can be deployed in the prime layer processor to ensure image edges are maintained. The resulting prime layer image sequence may represent a very clean edge pre-serving artistic style.

In addition or alternatively, one or more of the prime layer processors 204, 206, 208 may include removing random noise using an optical flow method for motion estimation. The resulting prime layer image sequence may represent an artistic style of clean plates, which can be free or substantially free from perceived noise in the images such as film grain or camera electronic noise.

In addition or alternatively, one or more of the prime layer processors 204, 206, 208 may include enhancing image quality by temporal filtering using motion. The resulting prime layer image sequence may represent an artistic style that maintains a balance between noise suppression and detail enhancement.

In addition or alternatively, one or more of the prime layer processors 204, 206, 208 may include enhancing temporal resolution of an image sequence using frame interpolation. The resulting prime layer image sequence may have additional image frames as the result of frame interpolation, representing an artistic style of improved motion smoothness with increased frame rates.

In addition or alternatively, one or more of the prime layer processors 204, 206, 208 may include dynamic range enhancement. The resulting prime layer image sequence may represent a high dynamic range or HDR artistic style. In addition or alternatively, one or more of the prime layer processors 204, 206, 208 may include a method of extending color gamut. The resulting prime layer image sequence may represent a wide color gamut or WCG artistic style.

In addition or alternatively, one or more of the prime layer processors 204, 206, 208 may include adding artificially generated film grains. The resulting prime layer image sequence may represent an old-film-look visual style. In addition or alternatively, the original image sequence can be treated as a prime layer image sequence without any treatment, and the one or more prime layer processors 204, 206, 208 may be an all-pass filter that does not alter the images. Other types of image processing methods may be used in any of the prime layer processors 204, 206, 208 as long as those methods can assist to produce desired artistic styles.

An appearance graph can be constructed to provide an image sequence with a new visual appearance with which further fine tuning may be executed. An appearance graph can include a number of prime layer nodes, each representing a prime layer image sequence with a distinctive artistic style. Since a minimum of two prime layer image sequences are used for a blending function, an appearance graph can have at least two prime layer nodes. A second layer node may be generated from blending a number of prime layer nodes, indicating that a new image sequence is generated with a new visual appearance. A second layer node may be further used to blend with one or more second layer nodes and possibly with one or more prime layer nodes to form a third layer node, and so on. The third layer node can be used to fine tune the conversion to a specific display device or to address bandwidth limitations. In general, a higher layer node is generated by blending a number of lower layer nodes, indicating that a high layer image sequence is generated with a newer appearance that is a mixture of the artistic styles of the lower layer image sequences with improvements that can overcome display system limitations.

In FIG. 2, there is an appearance graph 230 that represents part of the blending process. Three prime layer image sequences generated from the previous step are represented by prime layer node A 210, prime layer node B 212, and prime layer node C 214, or node A 210, node B 212, and node C 214 in a short form. Node B 212 and node C 214 can be combined using a blending function to create a new second layer node D 216. There is a link 218 between node A 210 and node B 212, indicating that these two nodes may be blended together. Between node A 210 and node C 214 there is also a link 220, which also indicates that those two nodes may also be blended together. Likewise for node B 212 and node C 214, there is a link 222. In the example of FIG. 2, node B and node C are used to create a new image sequence, represented by the second layer node D 216, with a new appearance.

In some examples, the blending function is implemented as the weighted arithmetic mean. In FIG. 2, pixels from node D 216 may be computed from corresponding pixels from node B 212 and node C 214 using the following formula:

$$I_{new}(x,y,t) = w_1 I_2(x,y,t) + w_2 I_3(x,y,t)$$

where $w_1$ is a weight assigned to the second prime layer image sequence, represented by node B 212, and $w_2$ is a weight assigned to the third prime layer image sequence, represented by node C 214. $I_{new}(x,y,t)$ is the pixel value of the new image sequence at space-time location(x,y,t), and $I_i(x,y,t)$ is the pixel value of the $i^{th}$ prime layer sequence at the same space-time location(x,y,t). Other examples for the blending function are also possible, including median or geometrical mean.

The new image sequence can be further fine-tuned by adjusting the weights $w_1$ and $w_2$ until a satisfactory appearance is attained. In order to preserve brightness and color, the fine tuning process can meet the following conditions:

$$w_1 + w_2 = 1, \ 0 < w_1 < 1, \ 0 < w_2 < 1.$$

A file conversion process 224 may be used to package the new image sequence as an output image sequence 226 into a certain output file format as used by some applications.

Figure 3:
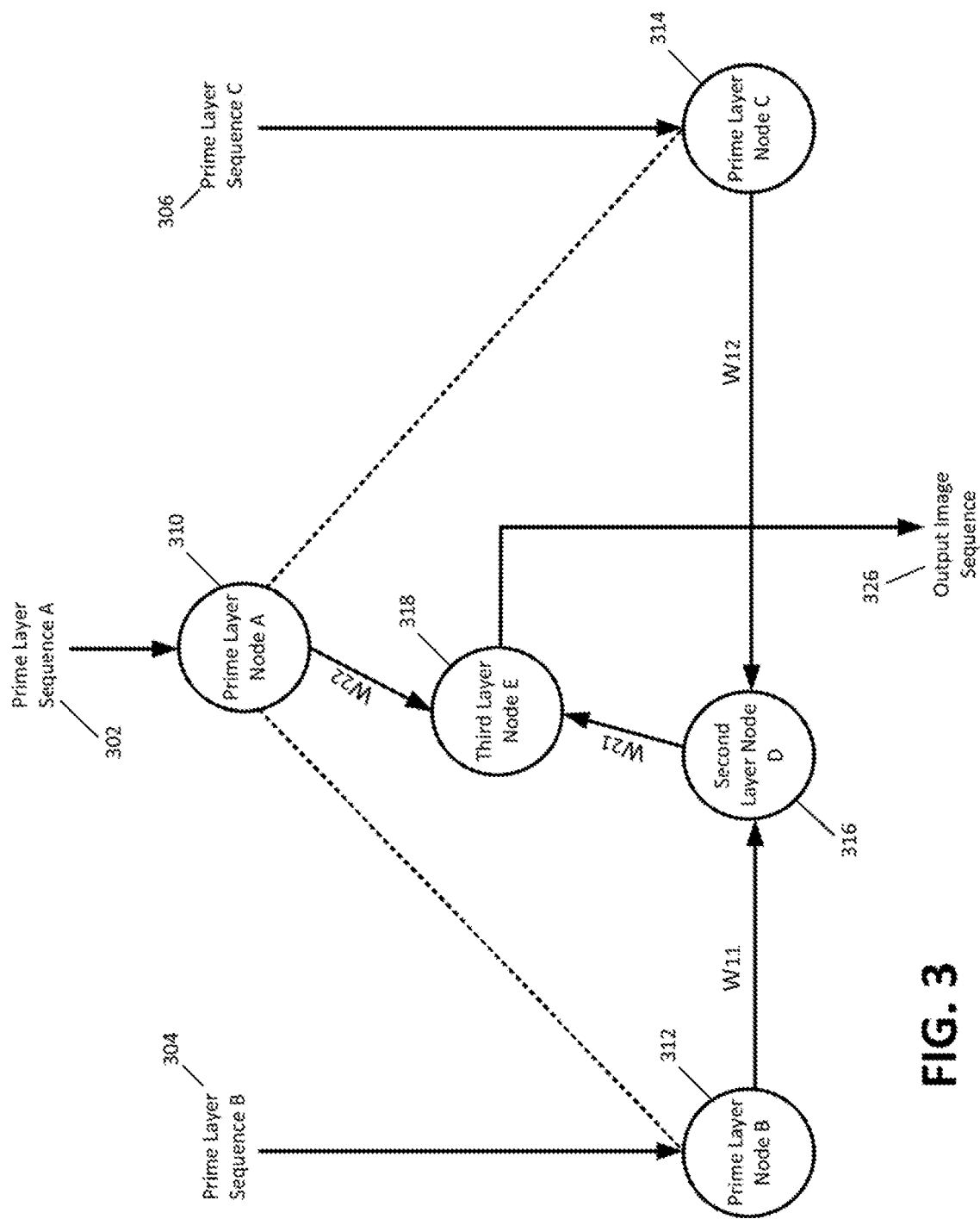
FIG. 3 is a diagram of an appearance map used in a blending process for enhancing an image sequence according to some aspects of the present disclosure.

Another example of a blending process is depicted in FIG. 3, along with another example of an appearance map. Three prime layer image sequences are generated, and the process of creating those prime layer image sequences are omitted in order to focus the discussions on the appearance map. Prime layer sequence A 302 is represented by prime layer node A 310, prime layer sequence B 304 is represented by prime layer node B 312, and prime layer sequence C 306 is represented by prime layer node C 314. Similar to FIG. 2, node B 312 and node C 314 are blended together to create a second layer node D 316, after weights assigned to node B 312 and node C 314 are fine-tuned. The second layer node D 316 image sequence is further blended with node A 310 to create a third-layer image sequence represented by node E 318. The third layer image sequence 318 has a new appearance with contributions from node B 312, node C 314, and node A 310. In the second blending process, weights $w_{21}$, $w_{22}$ that are assigned to node D 316 and node A 310, respectively, are fine tuned to create a desirable new appearance. The node E 318 sequence becomes the output image sequence 326 after two blending processes. For simplicity, the file format conversion step is omitted.

Figure 4:
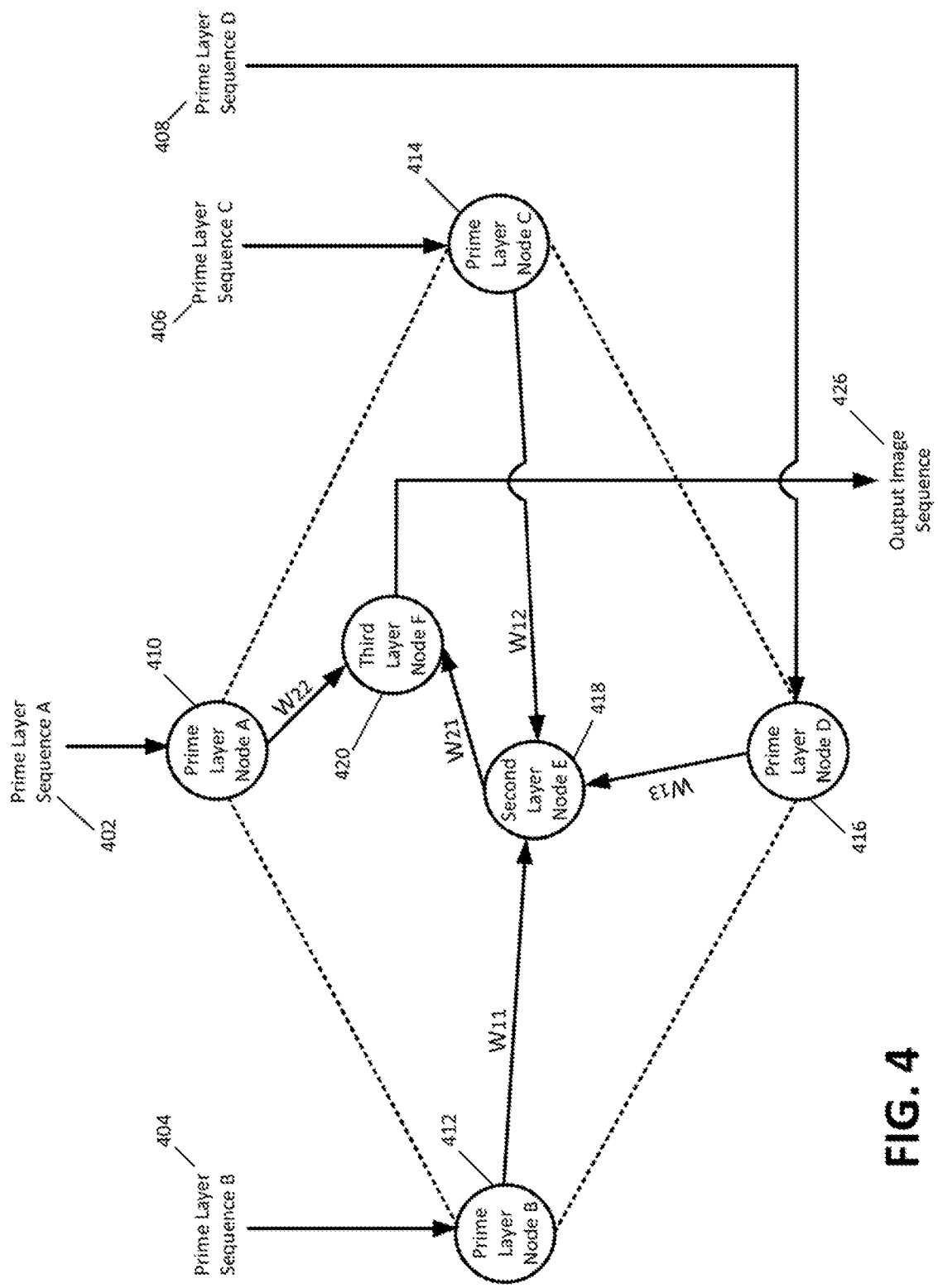
FIG. 4 is a diagram of another example of an appearance map used in a blending process for enhancing an image sequence according to some aspects of the present disclosure.

Another example of a blending process is depicted in FIG. 4, along with another example of an appearance map. Four prime layer image sequences are generated. Prime layer sequence A 402 is represented by prime layer node A 410, prime layer sequence B 404 is represented by prime layer node B 412, prime layer sequence C 406 is represented by prime layer node C 414, and prime layer sequence D 408 is represented by prime layer node D 416. Three prime layer nodes—node B 412, node C 414, and node D 416—are blended together to create a second layer node E 418. The fine tuning process can involve adjusting three weights: $w_{11}$ assigned to node B 412, $w_{12}$ assigned to node C 414, and $w_{13}$ assigned to node D 416. After the second layer node E 418 is finalized, it is further blended with node A 410 to create a third-layer image sequence represented by node F 420. The third layer image sequence represented by node F 420 has a new appearance with contributions from node B 412, node C 414, node D 416, and node A 410. In the second blending process, weights $w_{21}$, $w_{22}$ that are assigned to node F 420 and node A 410, respectively, are fine tuned to create a desirable new appearance. The node F 420 sequence becomes the output image sequence 426.

The appearance map as disclosed by the examples above can be expanded to cover a blending process with any number of prime layer sequences and any number of blending layers. In a general case, when new image sequence, represented by a node at a higher layer, is generated by blending M lower layer image sequences $I_1, I_2, \ldots, I_M$, a general form of blending formula may be described by:

$$I_{new}(x,y,t)=\Sigma_{i=1}^{M} w_i I_i(x,y,t).$$

The weights can meet the following conditions:

$$\Sigma_{i=1}^{M} w_i = 1,$$

$$0 < w_i < 1 \text{ for } (i=1, 2, \ldots, M)$$

when brightness-preserving and color-preserving are used.

Figure 5:
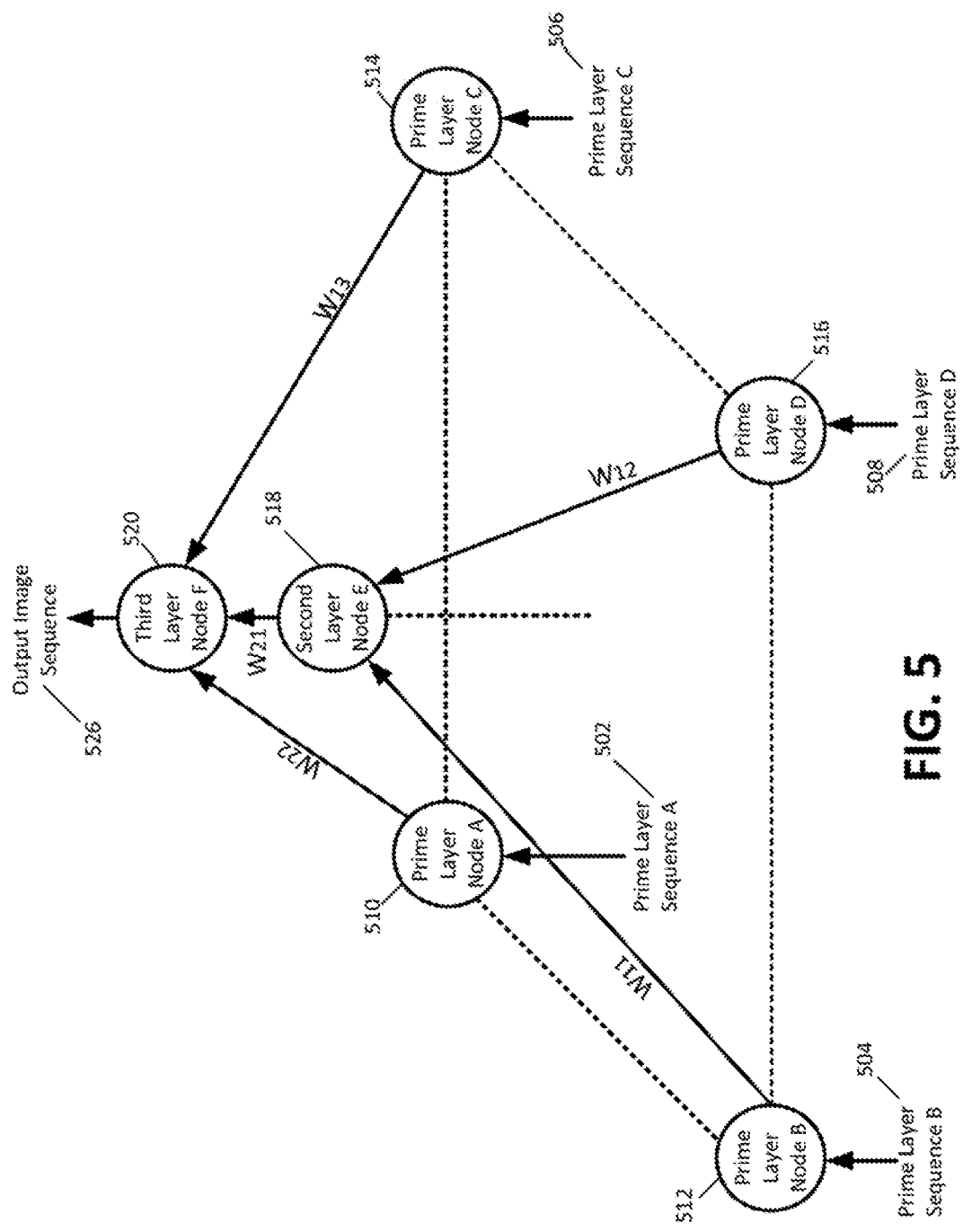
FIG. 5 is a diagram of three-dimensional appearance map used in a blending process for enhancing an image sequence according to some aspects of the present disclosure.

An appearance graph may be graphically presented in alternative forms. In one example, an appearance graph is plotted as a three-dimensional graph in which nodes from the same layers are placed on the same plane, while nodes from a higher layer node are placed at a higher plane. An example of a three-dimensional appearance graph is depicted in FIG. 5, which describes the same blending function as FIG. 4. A three-dimensional representation may be more visually pleasing when a blending function involves a large number of nodes and large number of blending layers.

In the example of FIG. 5, prime layer sequence A 502 is represented by prime layer node A 510, prime layer sequence B 504 is represented by prime layer node B 512, prime layer sequence C 506 is represented by prime layer node C 514, and prime layer sequence D 508 is represented by prime layer node D 516. Nodes 510, 512, 514, and 516 are on the same plane. Second layer node E, which is formed by node B 512 and node D 516, along with associated weights that are depicted, is on a different plane. Third layer node F 520, which becomes the output image sequence 526 and is formed from node E 518, node A 510, and node C, along with associated weights that are depicted, is on an even different plane.

Although nodes in FIG. 5 of different layers are labelled with text, nodes of different layers in other examples may be labelled by different colors, shapes, sizes, or otherwise. Despite of various forms of graphical descriptions, an appearance graph with selected sets of weights can define a process of generating an enhanced image sequence with a definite appearance, and the result is repeatable. The appearance graph may also be implemented as a graphic user interface for interactive controls of the blending process.

For a blending function to be successful, prime layer image sequences can have the same pixel registration as the input image sequence. The image methods and algorithms implemented in any prime layer processor, as shown in FIG. 2, can be shift invariant to avoid degradation of image sharpness and details.

One example of a blending process is that one prime layer image sequence represents a clean plate style, which may have less detail than the digital image data, and another prime layer image sequence is a super detailed image data generated from the digital image data, which may have more detail than the digital image data. The clean plate image data is blended with the super detailed image data to produce enhanced digital image data that is enhanced as compared to the digital image data that was received. Blending the clean plate image data with the super detailed image data to produce the enhanced digital image data can include blending the clean plate image data and the super detailed image data with the original image data to produce the enhanced digital image data. Blending the clean plate image data with the super detailed image data to produce the enhanced digital image data can be performed contemporaneously with a viewer viewing the enhanced digital image data on a display. Blending the clean plate image data with the super detailed image data can be performed within a streaming bandwidth threshold.

Certain applications may involve certain regions of an image having a different visual appearance than the rest of the image. Blending two or more image sequences at any layer of an appearance graph may be performed globally or locally. In one example, a blending function applies the same weights globally for the image pixels in each image frame. In another example, a blending function applies weights locally using different weights for different portions of image frames. In another example, a blending function applies a different set of weights for different scenes or even different image frames in an image sequence. A mask can be created to define a local area in which different or optimal local blending operations can be applied to the local region.

In some aspects, the digital image data is analyzed to identify at least two different objects or regions. Each object or region can be blended differently to produce blended enhanced digital image data for each object or region. The enhanced digital image data for each object or region can be combined to produce the enhanced digital image data. Blending differently for each object or region of the at least two different objects or regions to produce the blended enhanced digital image data for each object or region can include using a blending input received from a film director of a feature cinema-type presentation. One or more blending settings for the objects or regions can be stored. And the blending settings can be applied to corresponding objects or regions in another feature cinema presentation made by the film director.

One example may include a scene of a close-up human face where a certain skin tone area of the face may use a slightly different texture than the rest of the scene. A solution is to blend the skin tone area with a different set of weights. A local mask is created to track the skin tone area across the scene. One set of weights are applied inside the mask and a different set of weights are applied outside the mask. The mask for the skin tone area may be generated by a method of face recognition and tracking. Another example includes a scene of a landscape. The sky may have a cleaner look than hills and trees. A local mask is created to isolate the sky using a color separation algorithm, and a different set of weights are applied to the isolated sky area. Such a local appearance control may be generalized to include any number of local masks, each is associated with a different set of weights. Soft local masks may also be used in which the value of the weights may change gradually from inside the mask to the edge of the masks.

Certain other applications may involve the appearance changing from scene to scene and even from frame to frame. One example of such applications may include a day-time scene followed by a night scene. The day-time scene may need a sharper look while the night scene may contain more noise and involve extra noise cleaning. A solution is to select a certain set of weights for the day-time scene and another set of weights for the night scene. The change of weights may be controlled by a temporal window that defines a start frame and an end frame.

Certain examples of the digital enhancement of an input image sequence and output of an enhanced image sequence can be implemented in a hardware computing device connected to an image display system through an external connection. The computing performed in the hardware computing device can be achieved using a general purpose computer transformed into a special purpose computer configured to perform various methods according to various examples of the present disclosure with high performing graphics processing unit (GPU) cards. Such a configuration may allow computing tasks to be implemented in software, such as in OpenGL GLSL, Cg or CUDA, taking advantage of the computational power of the GPU. For example, a computer program product can be disposed onto one or more hardwire devices, such as those described above or other devices such as a computer system or server. The computer program product may include executable code stored on a computer-readable memory that, when executed, can cause the hardwire devices to perform various methods according to various examples of the present disclosure. Using GPU may reduce the cost for the development of an embedded device and may provide flexibility for future feature upgrades. The enhanced image sequence data produced by the hardware computing device or software can be displayed directly on the image display system through the external connection.

FIG. 6 is a block diagram of an example of a computing system that includes an image processing device 600 that can be used to process images in accordance with various aspects of the present disclosure. The image processing device 600 includes a processor 602, a memory 604, and a bus 606. The memory 604 includes a computer-readable memory device on which code is stored. The processor 602 can execute code stored in the memory 604 by communication via the bus 606 to cause the image processing device 600 to perform actions. The image processing device 600 can include an input/output (I/O) interface 608 for communication with other components, such as a display device 614. The image processing device 600 may be any device that can process data and execute code that is a set of instructions to perform actions. Examples of the image processing device 600 include a database server, a web server, desktop personal computer, a laptop personal computer, a handheld computing device, and a mobile device.

Examples of the processor 602 include a microprocessor, an application-specific integrated circuit (ASIC), a state machine, or other suitable processor. The processor 602 may include one processor or any number of processors. The processor 602 can access code stored in the memory 604 via the bus 606. The memory 604 may be any non-transitory computer-readable medium configured for tangibly embodying code and can include electronic, magnetic, or optical devices. Examples of the memory 604 include random access memory (RAM), read-only memory (ROM), a floppy disk, compact disc, digital video device, magnetic disk, an ASIC, a configured processor, or other storage device.

Instructions can be stored in the memory 604 as executable code. The instructions can include processor-specific instructions generated by a compiler or an interpreter from code written in any suitable computer-programming language. The instructions can include an application, such as an image processing engine 610, that, when executed by the processor 602, can cause the image processing device 600 to perform actions, such as those described in connection with FIGS. 1-5. The image processing device 600 may also include a GPU. The memory 604 can also include a datastore 612 in which content and data can be stored. Certain aspects can be implemented in a projector system, such as a projector system that includes the image processing device 600.

Examples according to some aspects of the present disclosure are described as follows.

Example 1 is a method of enhancing a digital image sequence, the method comprising: receiving the digital image sequence that has multiple image frames; determining, from the digital image sequence, an appearance graph that includes a plurality of prime layer nodes, each prime layer node of the plurality of prime layer nodes representing a distinctive visual style; computing a prime layer image sequence for each prime layer node that matches the visual style represented by the prime layer node; and generating an enhanced image sequence by blending at least two prime layer image sequences as defined by the appearance graph.

Example 2 is the method of example 1, wherein blending the at least two prime layer image sequences includes applying separate weights to each of the at least two prime layer image sequences, the method further comprising refining the enhanced image sequence to achieve a specific visual appearance by adjusting the separate weights used in blending.

Example 3 is the method of example 1, further comprising receiving the digital image sequence as digital image data; generating clean plate image data from the digital image data, the clean plate image data having less detail than the digital image data; generating super detailed image data from the digital image data, the super detailed image data having more detail than the digital image data; and blending the clean plate image data with the super detailed image data to produce enhanced digital image data.

Example 4 is the method of example 3, wherein blending the clean plate image data with the super detailed image data to produce the enhanced digital image data includes blending the clean plate image data and the super detailed image data with the digital image data to produce the enhanced digital image data.

Example 5 is the method of example 3, wherein blending the clean plate image data with the super detailed image data to produce the enhanced digital image data is performed contemporaneously with a viewer viewing the enhanced digital image data on a display.

Example 6 is the method of example 3, further comprising: analyzing the digital image data to identify at least two different objects or regions; blending differently for each object or region of the at least two different objects or regions to produce blended enhanced digital image data for each object or region; and combining the enhanced digital image data for each object or region to produce the enhanced digital image data.

Example 7 is the method of example 6, wherein blending differently for each object or region of the at least two different objects or regions to produce the blended enhanced digital image data for each object or region includes using a blending input received from a film director of a feature cinema-type presentation.

Example 8 is the method of example 7, further comprising: storing one or more blending settings for the at least two different objects or regions; and applying the one or more blending settings with corresponding objects or regions in another feature cinema presentation made by the film director.

Example 9 is the method of example 3, wherein blending the clean plate image data with the super detailed image data is performed within a streaming bandwidth threshold.

Example 10 is a system comprising: a processing device; and a memory device including instructions that are executable by the processing device for causing the processing device to: receive a digital image sequence that has multiple image frames; determine, from the digital image sequence, an appearance graph that includes a plurality of prime layer nodes, each prime layer node of the plurality of prime layer nodes representing a distinctive visual style; compute a prime layer image sequence for each prime layer node that matches the visual style represented by the prime layer node; and generate an enhanced image sequence by blending at least two prime layer image sequences as defined by the appearance graph.

Example 11 is the system of example 10, wherein blending the at least two prime layer image sequences includes applying separate weights to each of the at least two prime layer image sequences, wherein the memory device further includes instructions that are executable by the processing device for refining the enhanced image sequence to achieve a specific visual appearance by adjusting the weights used in blending.

Example 12 is the system of example 10, wherein the memory device further includes instructions that are executable by the processing device for: receiving the digital image sequence as digital image data; generating clean plate image data from the digital image data, the clean plate image data having less detail than the digital image data; generating super detailed image data from the digital image data, the super detailed image data having more detail than the digital image data; and blending the clean plate image data with the super detailed image data to produce enhanced digital image data.

Example 13 is the system of example 12, wherein blending the clean plate image data with the super detailed image data to produce the enhanced digital image data includes blending the clean plate image data and the super detailed image data with the digital image data to produce the enhanced digital image data.

Example 14 is the system of example 12, wherein blending the clean plate image data with the super detailed image data to produce the enhanced digital image data is performed contemporaneously with a viewer viewing the enhanced digital image data on a display.

Example 15 is the system of example 12, wherein the memory device further includes instructions that are executable by the processing device for: analyzing the digital image data to identify at least two different objects or regions; blending differently for each object or region of the at least two different objects or regions to produce blended enhanced digital image data for each object or region; and combining the enhanced digital image data for each object or region to produce the enhanced digital image data.

Example 16 is the system of example 15, wherein blending differently for each object or region of the at least two different objects or regions to produce the blended enhanced digital image data for each object or region includes using a blending input received from a film director of a feature cinema-type presentation.

Example 17 is the system of example 16, wherein the memory device further includes instructions that are executable by the processing device for: storing one or more blending settings for the at least two different objects or regions; and applying the one or more blending settings with corresponding objects or regions in another feature cinema presentation made by the film director.

Example 18 is the system of example 12, wherein blending the clean plate image data with the super detailed image data is performed within a streaming bandwidth threshold.

Example 19 is a non-transitory computer-readable medium comprising program code that is executable by a processor for causing the processor to: receive a digital image sequence that has multiple image frames; determine, from the digital image sequence, an appearance graph that includes a plurality of prime layer nodes, each prime layer node of the plurality of prime layer nodes representing a distinctive visual style; compute a prime layer image sequence for each prime layer node that matches the visual style represented by the prime layer node; and generate an enhanced image sequence by blending at least two prime layer image sequences as defined by the appearance graph.

Example 20 is the non-transitory computer-readable medium of example 19, wherein blending the at least two prime layer image sequences includes applying separate weights to each of the at least two prime layer image sequences, the method further comprising refining the enhanced image sequence to achieve a specific visual appearance by adjusting the weights used in blending.

Example 21 is the non-transitory computer-readable medium of example 20, further comprising program code that is executable by the processor for: receiving the digital image sequence as digital image data; generating clean plate image data from the digital image data, the clean plate image data having less detail than the digital image data; generating super detailed image data from the digital image data, the super detailed image data having more detail than the digital image data; and blending the clean plate image data with the super detailed image data to produce enhanced digital image data.

Example 22 is the non-transitory computer-readable medium of example 21, wherein blending the clean plate image data with the super detailed image data to produce the enhanced digital image data includes blending the clean plate image data and the super detailed image data with the digital image data to produce the enhanced digital image data.

Example 23 is the non-transitory computer-readable medium of example 21, wherein blending the clean plate image data with the super detailed image data to produce the enhanced digital image data is performed contemporaneously with a viewer viewing the enhanced digital image data on a display.

Example 24 is the non-transitory computer-readable medium of example 21, further comprising program code that is executable by the processor for: analyzing the digital image data to identify at least two different objects or regions; blending differently for each object or region of the at least two different objects or regions to produce blended enhanced digital image data for each object or region; and combining the enhanced digital image data for each object or region to produce the enhanced digital image data.

Example 25 is the non-transitory computer-readable medium of example 24, wherein blending differently for each object or region of the at least two different objects or regions to produce the blended enhanced digital image data for each object or region includes using a blending input received from a film director of a feature cinema-type presentation.

Example 26 is the non-transitory computer-readable medium of example 25, further comprising: storing one or more blending settings for the at least two different objects or regions; and applying the one or more blending settings with corresponding objects or regions in another feature cinema presentation made by the film director.

Example 27 is the non-transitory computer-readable medium of example 21, wherein blending the clean plate image data with the super detailed image data is performed within a streaming bandwidth threshold.

The foregoing is provided for purposes of illustrating, explaining, and describing embodiments of the present disclosure. Further modifications and adaptations to these embodiments will be apparent to those skilled in the art and may be made without departing from the scope of the disclosure.

What is claimed is:

1. A method of enhancing a digital image sequence, the method comprising:
    receiving the digital image sequence that has multiple image frames;
    generating, from the digital image sequence, a plurality of prime layer image sequences, wherein each prime layer image sequence is generated by a respective prime layer processor, wherein each prime layer processor includes a set of image processing methods and algorithms, such that each prime layer image sequence represents a distinctive visual style;
    determining an appearance graph that includes a plurality of prime layer nodes, wherein each prime layer image sequence is represented by a prime layer node such that each prime layer node of the plurality of prime layer nodes represents the distinctive visual style of the respective prime layer image sequence;
    generating a second layer node by blending at least two prime layer nodes of the appearance graph; and
    generating an enhanced image sequence corresponding to the second layer node by blending the at least two prime layer image sequences corresponding to the at least two prime layer nodes blended to generate the second layer node.

2. The method of claim 1, wherein blending the at least two prime layer image sequences includes applying separate weights to each of the at least two prime layer image sequences, the method further comprising refining the enhanced image sequence to achieve a specific visual appearance by adjusting the separate weights used in blending.

3. The method of claim 1, further comprising
    receiving the digital image sequence as digital image data;
    generating clean plate image data from the digital image data, the clean plate image data having less detail than the digital image data;
    generating super detailed image data from the digital image data, the super detailed image data having more detail than the digital image data; and
    blending the clean plate image data with the super detailed image data to produce enhanced digital image data.

4. The method of claim 3, wherein blending the clean plate image data with the super detailed image data to produce the enhanced digital image data includes blending the clean plate image data and the super detailed image data with the digital image data to produce the enhanced digital image data.

5. The method of claim 3, wherein blending the clean plate image data with the super detailed image data to produce the enhanced digital image data is performed contemporaneously with a viewer viewing the enhanced digital image data on a display.

6. The method of claim 3, further comprising:
    analyzing the digital image data to identify at least two different objects or regions;
    blending differently for each object or region of the at least two different objects or regions to produce blended enhanced digital image data for each object or region; and
    combining the enhanced digital image data for each object or region to produce the enhanced digital image data.

7. The method of claim 6, wherein blending differently for each object or region of the at least two different objects or regions to produce the blended enhanced digital image data for each object or region includes using a blending input received from a film director of a feature cinema-type presentation.

8. The method of claim 7, further comprising:
    storing one or more blending settings for the at least two different objects or regions; and
    applying the one or more blending settings with corresponding objects or regions in another feature cinema presentation made by the film director.

9. The method of claim 3, wherein blending the clean plate image data with the super detailed image data is performed within a streaming bandwidth threshold.

10. A system comprising:
    a processing device; and
    a memory device including instructions that are executable by the processing device for causing the processing device to:
    receive a digital image sequence that has multiple image frames;
    generate, from the digital image sequence, a plurality of prime layer image sequences, wherein each prime layer image sequence is generated by a respective prime layer processor, wherein each prime layer processor includes a set of image processing methods and algorithms, such that each prime layer image sequence represents a distinctive visual style;
    determine an appearance graph that includes a plurality of prime layer nodes, wherein each prime layer image sequence is represented by a prime layer node such that each prime layer node of the plurality of prime layer nodes represents a distinctive visual style of the respective prime layer image sequence;
    generate a second layer node by blending at least two prime layer nodes of the appearance graph; and
    generate an enhanced image sequence corresponding to the second layer node by blending the at least two prime layer image sequences corresponding to the at least two prime layer nodes blended to generate the second layer node.

11. The system of claim 10, wherein the memory device includes instructions that are executable by the processing device for causing the processing device to blend the at least two prime layer image sequences by applying separate weights to each of the at least two prime layer image sequences, wherein the memory device further includes instructions that are executable by the processing device for refining the enhanced image sequence to achieve a specific visual appearance by adjusting the weights used in blending.

12. The system of claim 10, wherein the memory device further includes instructions that are executable by the processing device for:
    receiving the digital image sequence as digital image data;
    generating clean plate image data from the digital image data, the clean plate image data having less detail than the digital image data;

generating super detailed image data from the digital image data, the super detailed image data having more detail than the digital image data; and blending the clean plate image data with the super detailed image data to produce enhanced digital image data.

13. The system of claim 12, wherein the memory device includes instructions that are executable by the processing device for causing the processing device to blend the clean plate image data with the super detailed image data to produce the enhanced digital image data by blending the clean plate image data and the super detailed image data with the digital image data to produce the enhanced digital image data.

14. The system of claim 12, wherein the memory device includes instructions that are executable by the processing device for causing the processing device to blend the clean plate image data with the super detailed image data to produce the enhanced digital image data contemporaneously with a viewer viewing the enhanced digital image data on a display.

15. The system of claim 12, wherein the memory device further includes instructions that are executable by the processing device for:

analyzing the digital image data to identify at least two different objects or regions;

blending differently for each object or region of the at least two different objects or regions to produce blended enhanced digital image data for each object or region; and combining the enhanced digital image data for each object or region to produce the enhanced digital image data.

16. The system of claim 15, wherein the memory device includes instructions that are executable by the processing device for causing the processing device to blend differently for each object or region of the at least two different objects or regions to produce the blended enhanced digital image data for each object or region by using a blending input received from a film director of a feature cinema-type presentation.

17. The system of claim 16, wherein the memory device further includes instructions that are executable by the processing device for:

storing one or more blending settings for the at least two different objects or regions; and applying the one or more blending settings with corresponding objects or regions in another feature cinema presentation made by the film director.

18. The system of claim 12, wherein the memory device includes instructions that are executable by the processing device for causing the processing device to blend the clean plate image data with the super detailed image data within a streaming bandwidth threshold.

19. A non-transitory computer-readable medium comprising program code that is executable by a processor for causing the processor to:

receive a digital image sequence that has multiple image frames;

generate, from the digital image sequence, a plurality of prime layer image sequences, wherein each prime layer image sequence is generated by a respective prime layer processor, wherein each prime layer processor includes a set of image processing methods and algorithms, such that each prime layer image sequence represents a distinctive visual style;

determine an appearance graph that includes a plurality of prime layer nodes, wherein each prime layer image sequence is represented by a prime layer node such that each prime layer node of the plurality of prime layer nodes represents the distinctive visual style of the respective prime layer image sequence;

generate a second layer node by blending at least two prime layer nodes of the appearance graph; and generate an enhanced image sequence corresponding to the second layer node by blending the at least two prime layer image sequences corresponding to the at least two prime layer nodes blended to generate the second layer node.

20. The non-transitory computer-readable medium of claim 19, wherein blending the at least two prime layer image sequences includes applying separate weights to each of the at least two prime layer image sequences, the method further comprising refining the enhanced image sequence to achieve a specific visual appearance by adjusting the weights used in blending, the non-transitory computer-readable medium further comprising program code that is executable by the processor for:

receiving the digital image sequence as digital image data;

generating clean plate image data from the digital image data, the clean plate image data having less detail than the digital image data;

generating super detailed image data from the digital image data, the super detailed image data having more detail than the digital image data;

blending the clean plate image data with the super detailed image data to produce enhanced digital image data, wherein blending the clean plate image data with the super detailed image data to produce the enhanced digital image data includes blending the clean plate image data and the super detailed image data with the digital image data contemporaneously with a viewer viewing the enhanced digital image data on a display, and within a streaming bandwidth threshold, to produce the enhanced digital image data.

* * * * *